(12) United States Patent
Zuo et al.

(10) Patent No.: US 7,796,381 B2
(45) Date of Patent: Sep. 14, 2010

(54) BATTERY COVER LATCHING ASSEMBLY FOR PORTABLE ELECTRONIC DEVICE

(75) Inventors: Zhou-Quan Zuo, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1176 days.

(21) Appl. No.: 11/411,587

(22) Filed: Apr. 26, 2006

(65) Prior Publication Data

US 2006/0292439 A1 Dec. 28, 2006

(30) Foreign Application Priority Data

Jun. 24, 2005 (CN) .................. 2005 1 0035546

(51) Int. Cl.
 *H05K 7/12* (2006.01)
(52) U.S. Cl. ................... 361/679.57; 361/679.56; 361/679.01; 429/97
(58) Field of Classification Search .............. 361/679.3, 361/679.56, 679.57, 679.01; 429/97
 See application file for complete search history.

(56) References Cited

U.S. PATENT DOCUMENTS

| | | | | |
|---|---|---|---|---|
| 5,200,883 A | * | 4/1993 | Kobayashi | ............. 361/679.09 |
| 5,803,537 A | * | 9/1998 | Langmeser et al. | .... 297/188.19 |
| 5,955,700 A | * | 9/1999 | Slipy et al. | ..................... 174/50 |
| 6,057,055 A | * | 5/2000 | Kumagawa | .................. 429/97 |
| 6,625,425 B1 | * | 9/2003 | Hughes et al. | ............. 455/90.3 |
| 7,412,268 B2 | * | 8/2008 | Jung | ....................... 455/575.1 |
| 2002/0131584 A1 | | 9/2002 | Mote et al. | |

\* cited by examiner

*Primary Examiner*—Jayprakash N Gandhi
*Assistant Examiner*—Ingrid Wright
(74) *Attorney, Agent, or Firm*—Jeffrey T. Knapp

(57) ABSTRACT

A battery cover latching assembly is for a portable electronic device including a housing, a first cover configured for attaching to a first side of the housing, and a second cover configured for attaching to a second side of the housing. The battery cover latching assembly includes a locking portion, a resisting portion, and a latch. The locking portion is formed on the first cover. The resisting portion is formed on the second cover. The latch is attached to the housing and abutting the resisting portion. The latch includes an engaging portion and a button portion. The engaging portion is engageable with the locking portion so as to lock the first cover and the housing with each other. The button portion is movable so as to disengage the engaging portion from the locking portion, thereby unlocking the first cover from the housing.

15 Claims, 8 Drawing Sheets

BATTERY COVER LATCHING ASSEMBLY FOR PORTABLE ELECTRONIC DEVICE

BACKGROUND

1. Field of the Invention

The present invention generally relates to cover latching assemblies and, more particularly, to a battery cover latching assembly for use in a portable electronic device.

2. Discussion of the Related Art

Batteries are widely used in portable electronic devices, such as personal digital assistants (PDAs), mobile phones, and so on. Typical batteries are attachably received in the electronic device, and battery covers are designed to connect with housings of the electronic devices to package the batteries. The batteries have to be replaced by opening the battery covers when, for example the batteries are damaged or dead (i.e. no longer rechargeable).

A clasp structure or latch structure is used with a typical battery cover to engage with a housing of a portable electronic device. For example, some latches include a pair of hooks at one end of the battery cover and a locking pin protruding from the other end of the battery cover. Accordingly, a pair of grooves are defined in an end portion of a backside of a housing of the mobile phone, and a locking hole is defined in the other end portion of the backside of the housing. In assembly, the hooks are inserted into the grooves in the backside of the housing. Then, the battery cover is pressed downward onto the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm. However, during disassembly, a relative great effort is needed to disassemble the battery cover, since a substantial force is exerted thereon. The battery cover can easily be damaged during such disassembly. As a result, it is difficult for a user to replace a battery in the housing of the mobile phone.

Therefore, a new battery cover latching assembly is desired in order to overcome the above-described shortcomings.

SUMMARY

In one embodiment thereof, a battery cover latching assembly is for a portable electronic device including a housing, a first cover configured for attaching to a first side of the housing, and a second cover configured for attaching to a second side of the housing. The battery cover latching assembly includes a locking portion, a resisting portion, and a latch. The locking portion is formed on the first cover. The resisting portion is formed on the second cover. The latch is attached to the housing and abutting the resisting portion. The latch includes an engaging portion and a button portion. The engaging portion is engageable with the locking portion so as to lock the first cover and the housing with each other. The button portion is movable so as to disengage the engaging portion from the locking portion, thereby unlocking the first cover from the housing.

Other novel features will become more apparent from the following detailed description, when taken in conjunction with the accompanying drawings.

BRIEF DESCRIPTION OF THE DRAWINGS

Many aspects of the battery cover latching assembly can be better understood with reference to the following drawings. The components in the drawings are not necessarily drawn to scale, the emphasis instead being placed upon clearly illustrating the principles of the present battery cover latching assembly. Moreover, in the drawings, like reference numerals designate corresponding parts throughout the several views.

DETAILED DESCRIPTION OF THE EMBODIMENTS

Figure 1:
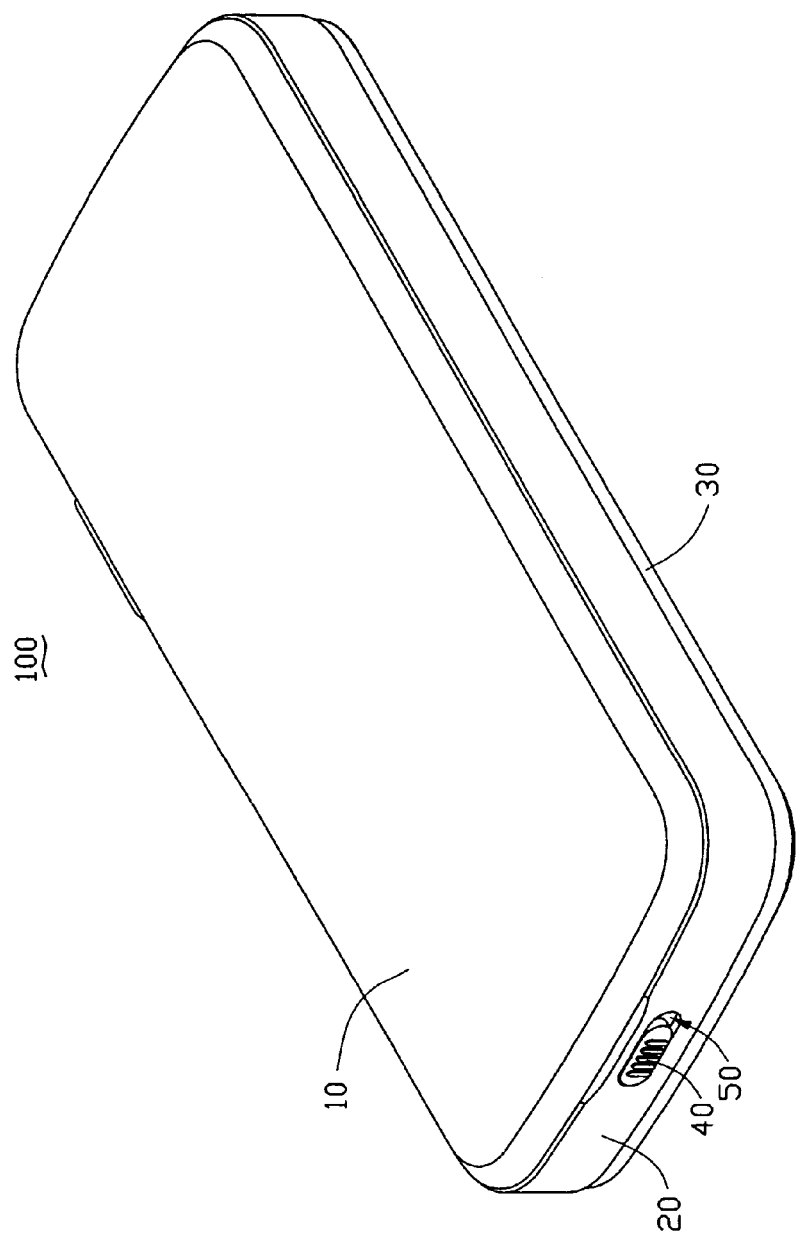
FIG. 1 is an assembled isometric view of a mobile phone incorporating a battery cover latching assembly in accordance with a preferred embodiment.
Figure 2:
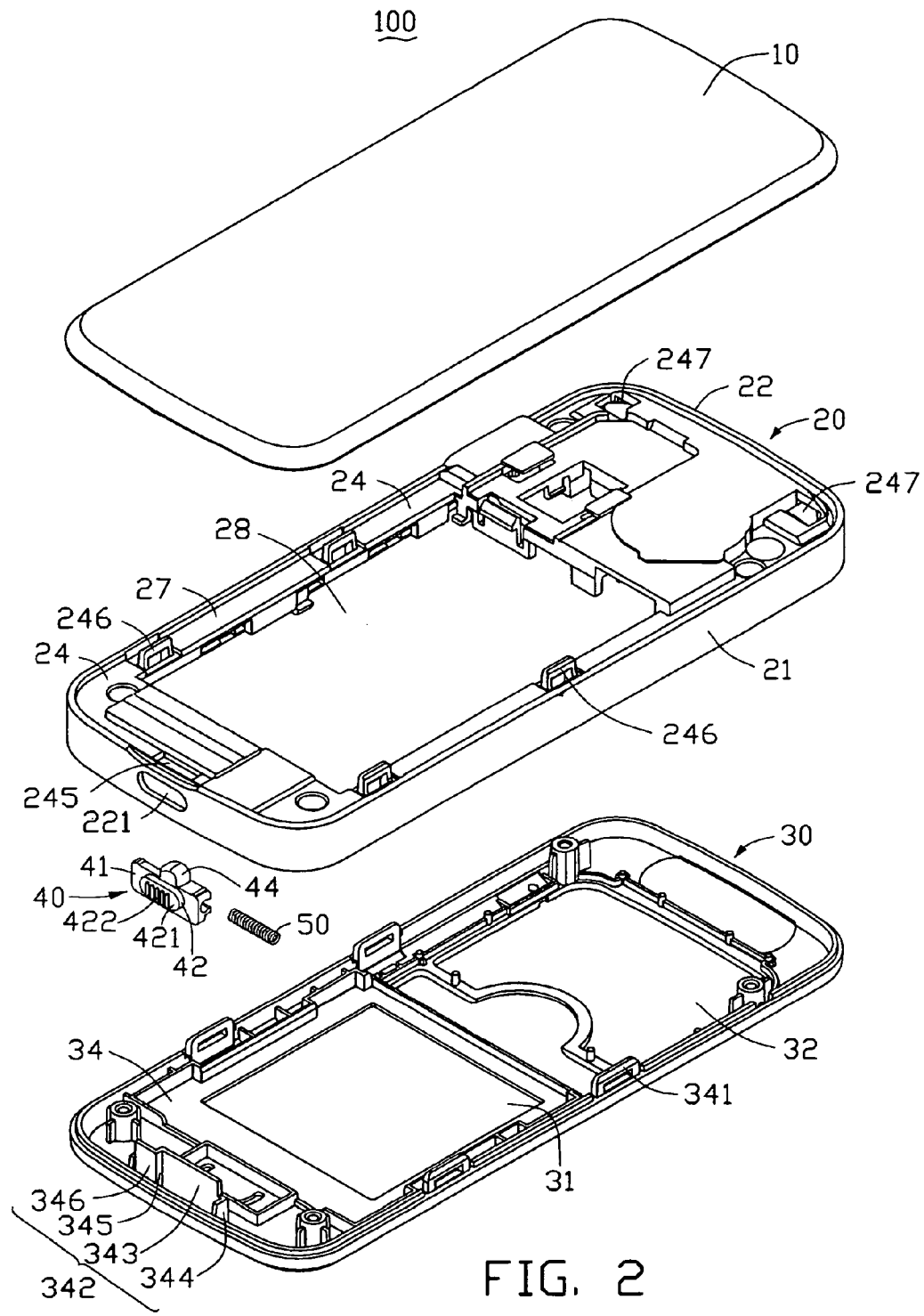
FIG. 2 is an exploded isometric view of the mobile phone shown in FIG. 1.
Figure 3:
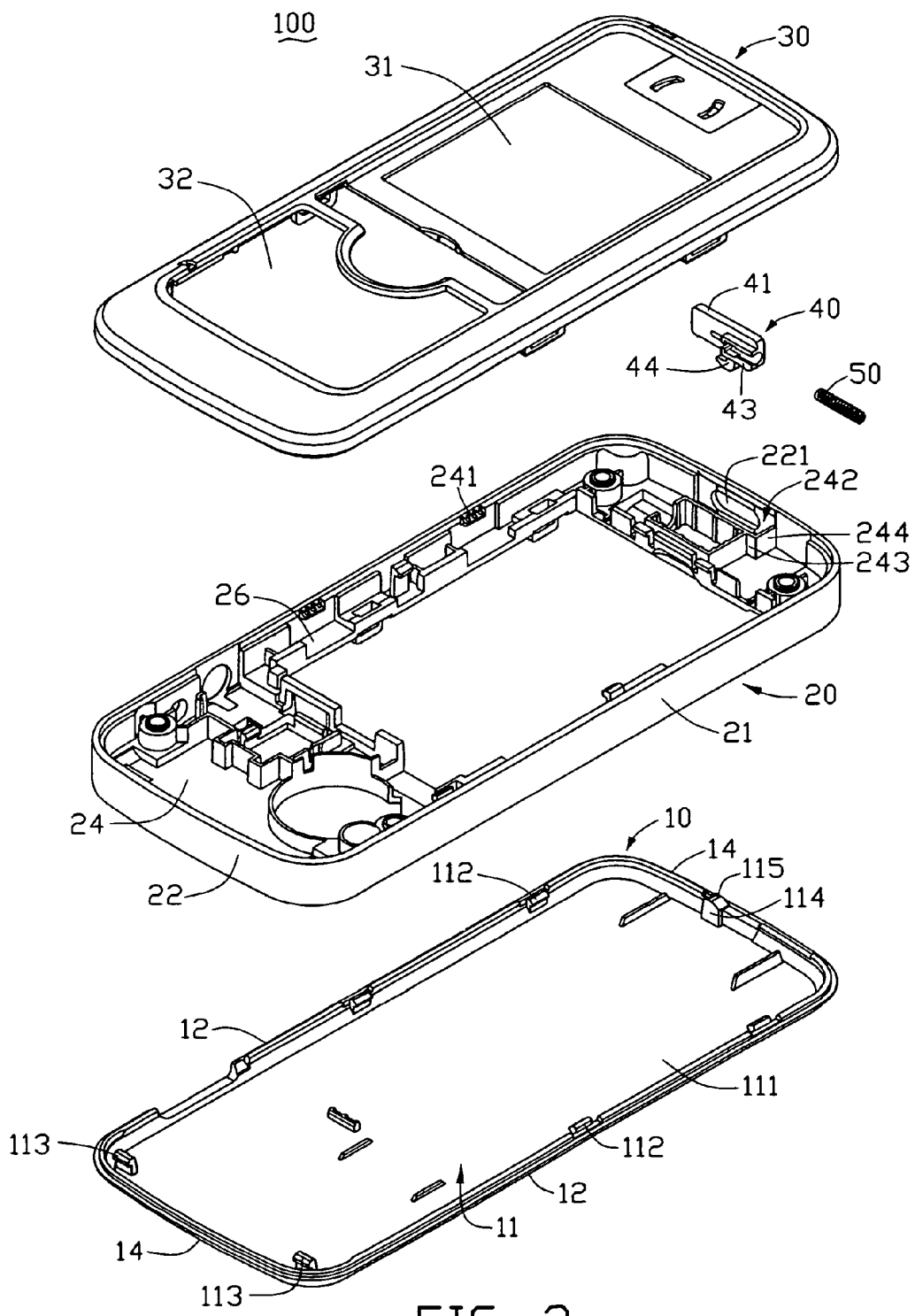
FIG. 3 is similar to FIG. 2, but viewed from another aspect.

Referring now to the drawings in detail, FIG. 1 shows a battery cover latching assembly 50 incorporated in a mobile phone/portable electronic device 100. The mobile phone 100 is taken here as an exemplary application for the purposes of describing details of the battery cover latching assembly 50 of the preferred embodiment. In alternative embodiment, the mobile phone 100 could be replaced by another portable electronic device, for example a personal digital assistant (PDA). The mobile phone 100 includes a battery cover 10, a housing 20 and a front cover 30, all of which are connected via the battery cover latching assembly 50. Referring also to FIG. 2 and FIG. 3, the battery cover latching assembly 50 includes a locking portion 114, a button hole 221, a latch containing portion 242, a resisting portion 342, a latch 40, and a spring 50. The locking portion 114 is defined in the battery cover 10. The button hole 221 and the latch containing portion 242 are defined in the housing 20. The resisting portion 342 is disposed in the front cover 30. The battery cover latching assembly 50 is mounted in the housing 20 and releasably locks the battery cover 10, thereby joining the housing 20 to the battery cover 10.

Figure 4:
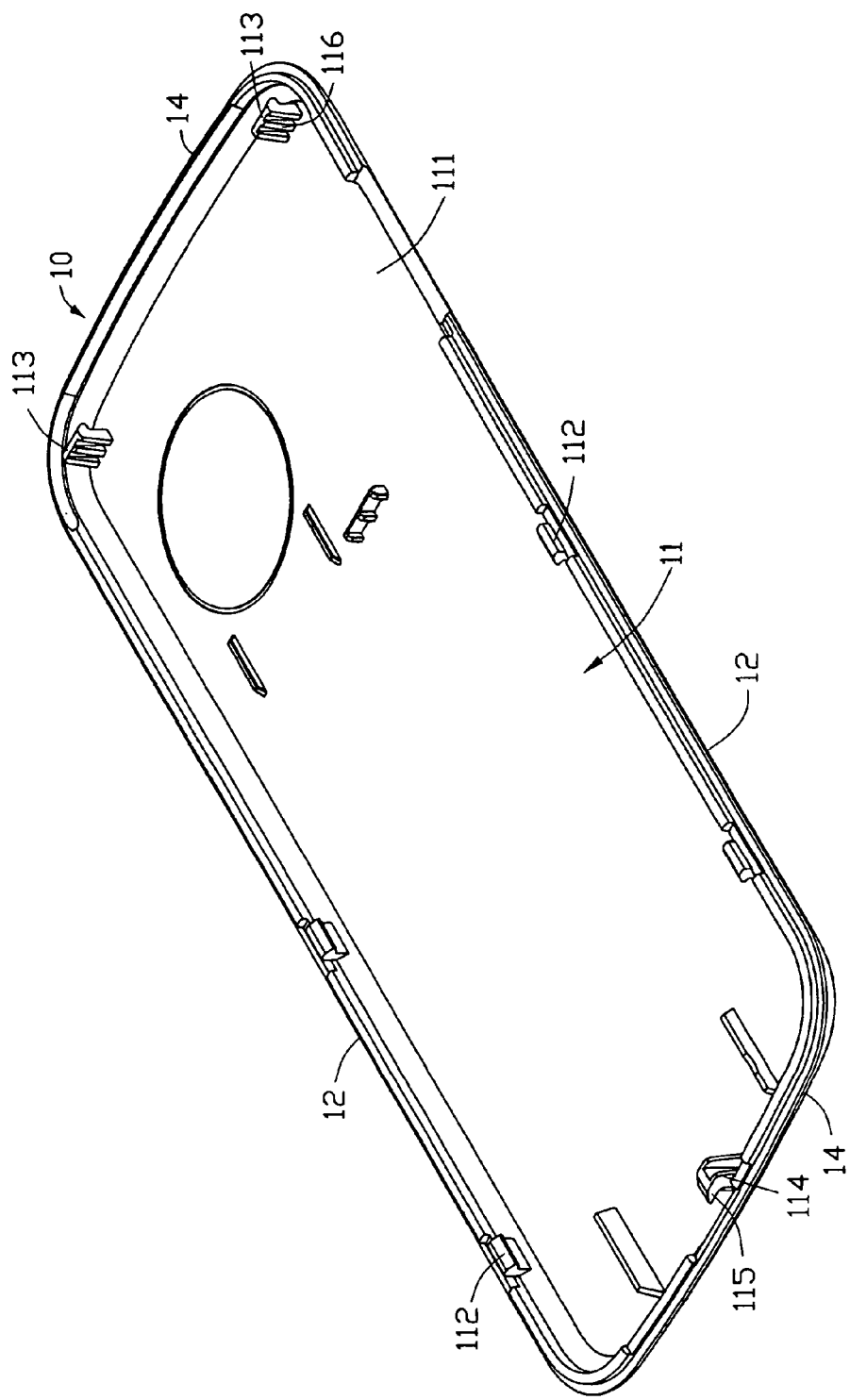
FIG. 4 is an enlarged, isometric view of a battery cover as shown in FIG. 1.

Referring also to FIG. 4, the battery cover 10 includes a main body 11, two opposing long sides 12 and two opposing short sides 14. The main body 11 is a substantial rectangular sheet, which together with the long sides 12 and the short sides 14 defines a substantially rectangular space (not labeled) for engaging with the housing 20. The main body 11 has an inner surface 111. A pair of symmetrical first claws 112 are disposed on the inner surface 111 of the main body 11 adjacent to each long side 12. One end of each first claw 112 is connected with the inner surface 111, and the other end of each first claw 112 is hooked. A pair of symmetrical second claws 113 are disposed on the inner surface 111 of the main body 11 adjacent to one short side 13. One end of each second claw 113 is connected with the inner surface 111, and the other end of each second claw 113 is hooked. In order to improve connection strength between the second claws 113 and the inner surface 111 of the main body 11, each second claw 113 further includes a plurality of tabs 116 formed on one surface thereof. The locking portion 114 is disposed on the inner surface 111 of the main body 11 adjacent to the other short side 13. One end of the locking portion 114 is connected with the inner surface 111, and a hook 115 is formed at the other end of the locking portion 114. The hook 115 is made of an elastic material.

Figure 5:
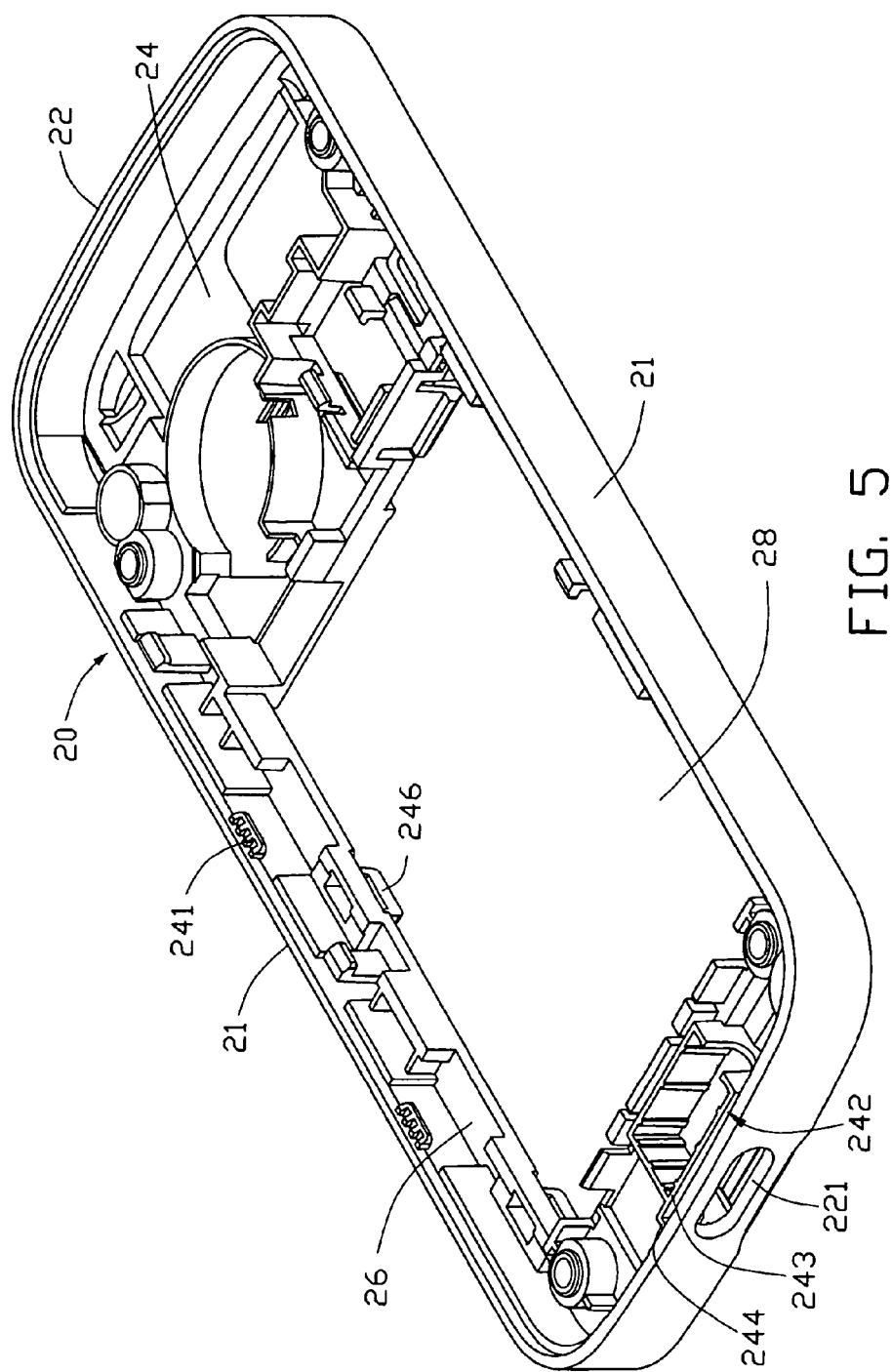
FIG. 5 is an enlarged, isometric view of a housing as shown in FIG. 1.

Referring also to FIG. 5, the housing 20 is a substantial rectangular space, which has two opposing sidewalls 21 and two opposing end walls 22. The housing 20 includes a main partition wall 24, and the partition wall 24 separates a first compartment 26 from an opposite second compartment 27. The first compartment 26 is advantageously configured for accommodating an electronic device (not shown), such as a printed circuit board, therein. This accommodation occurs when the housing 20 is assembled with other housings (for example the front cover 30) of the mobile phone 100. The second compartment 27 is used to engagingly receive the battery cover 10. A recess 28 is defined in a middle portion of the partition wall 24. The recess 28 is used to receive a battery (not shown).

At the first compartment 26, a pair of symmetrical clasps 241 are disposed on an inner surface of each sidewall 21. The latch containing portion 242 is formed in the partition wall 24 adjacent to one end wall 22 of the housing 20. The latch containing portion 242 includes a first wall 243, a part of the end wall 22, and a second wall 244 connected the first wall 243 and the end wall 22. The latch containing portion 242 has a bottom portion (not labeled), and the bottom portion is a part of the partition wall 24. A through hole 245 is defined in the bottom portion of the latch containing portion 242. The button hole 221 is defined in the end wall 22, and is in communication with the through hole 245. At the opposite second compartment 27, two pairs of symmetrical claw portions 246 are respectively formed in the partition wall 24 adjacent to the sidewalls 21. The claw portions 246 are each engaged with their corresponding first claws 112. A pair of symmetrical limiting portions 247 are formed in the partition wall 24 adjacent to the other end wall 22. The limiting portions 247 are each engaged with their corresponding second claws 113 of the battery cover 10.

Figure 6:
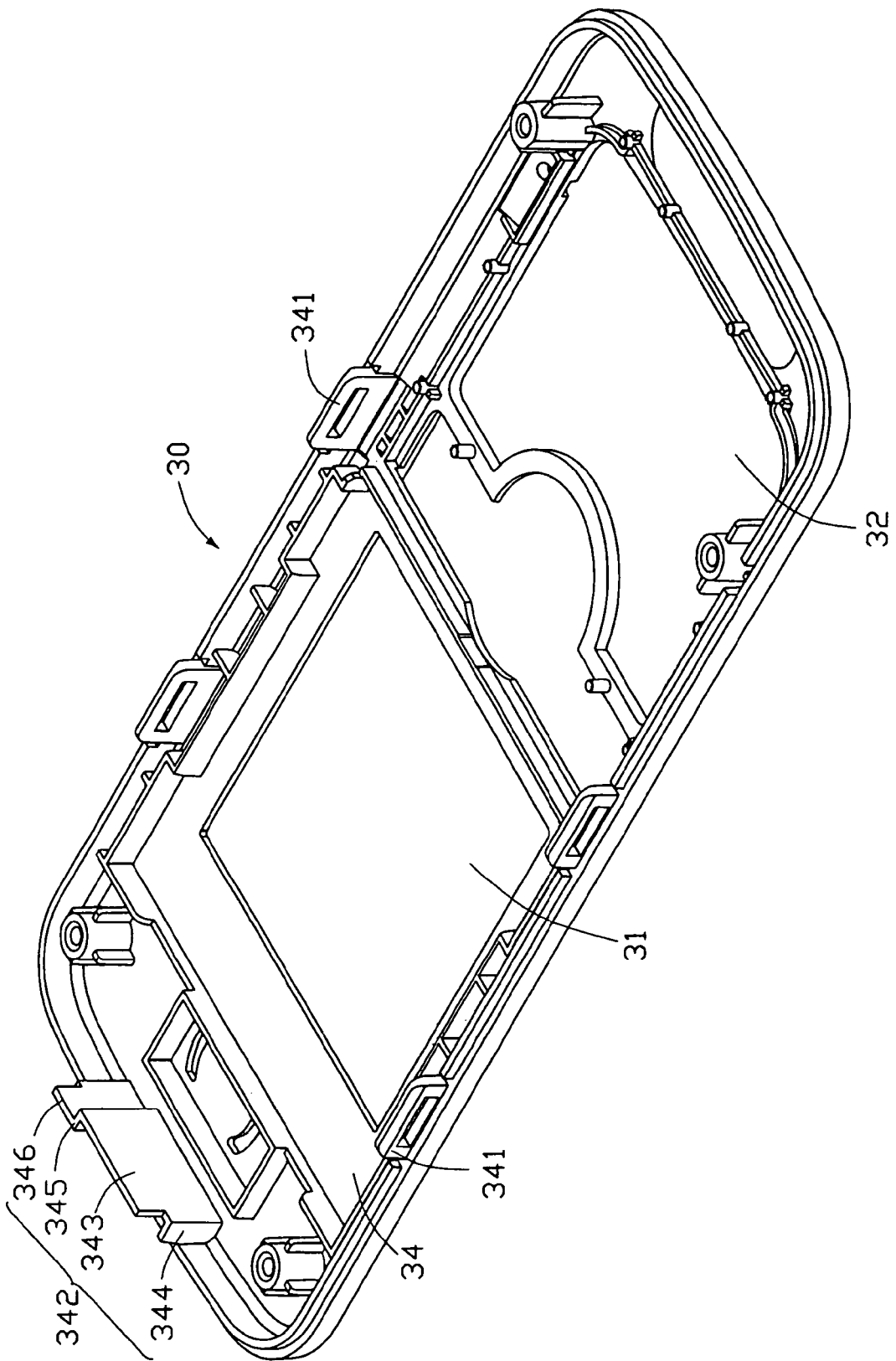
FIG. 6 is an enlarged, isometric view of a front cover as shown in FIG. 1.

Referring also to FIG. 6, the front cover 30 is a substantial rectangular sheet, and includes two opposing long sides (not labeled) and two opposing short sides (not labeled). The front cover 30 includes a display containing portion 31 used to contain a display (not shown), and a keyboard containing portion 32 used to contain a keyboard (not shown). A pair of symmetrical clasp portions 341 are formed in an inner surface 34 adjacent to each long side of the front cover 30. The clasp portions 341 are each engaged with their corresponding clasps 241. The resisting portion 342 is disposed on the inner surface 34 adjacent to one short side of the front cover 30. The resisting portion 342 is engaged with the latch containing portion 242 of the housing 20. The resisting portion 342 includes a main board 343, two side boards 344, 345 perpendicularly extending from two ends of the main board 343, and an assistant board 346 perpendicularly extending from one end of the side board 345. A height of the side board 344 is lower than that of the main board 343.

Figure 7:
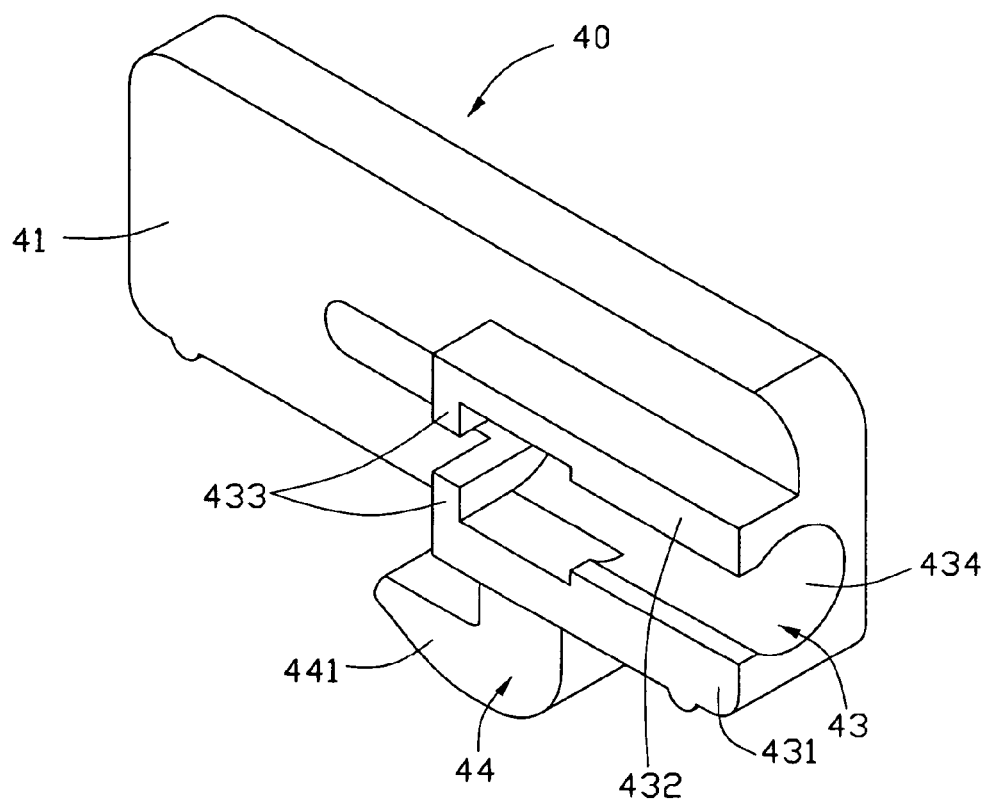
FIG. 7 is an enlarged, isometric view of a latch as shown in FIG. 1.

Referring also to FIG. 7, the latch 40 includes a body 41, a button portion 42 formed at one side of the body 41, a spring receiving portion 43 formed at the other side of the body 41, and an engaging portion 44. The button portion 42 has an operation surface 421. A plurality of protrusions 422 are disposed in the operation surface 421, in order to increase friction with a user's finger(s), thereby facilitating pushing of the button portion 42. The shape of the button portion 42 corresponds to the button hole 221 of the housing 20. A surface area of the button portion 42 is smaller than that of the button hole 221 of the housing 20, thus the button portion 42 is movable in the button hole 221 of the housing 20.

The spring receiving portion 43 is configured for receiving the spring 50. The spring receiving portion 43 includes a first board 431, a second board 432, and two separate resisting boards 433, which all extend perpendicularly from the body 41. One resisting board 433 extends from a first end of the first board 431 toward the second board 432, and the other resisting board 433 extends from a first end of the second board 432 toward the first board 431. Opposite second ends of the first and the second boards 431, 432 are both flat along a first end of the body 41. A first side of the first board 431 is flat along a first side of the body 41. A groove 434 is defined in the body 41 between the first board 431 and the second board 432.

The engaging portion 44 is configured for engaging with the locking portion 114 of the battery cover 10. The engaging portion 44 is disposed on the first sides of the body 41 and the first board 431. One end of the engaging portion 44 is connected with the first sides of the body 41 and the first board 431. A hook 441 is formed at the other end of the engaging portion 44. The hook 441 is made of an elastic material. The hook 441 is releasably engaged with the hook 115 of the battery cover 10.

The spring 50 is helical and preferably metallic. The spring 50 is engaged with the groove 434 of the spring receiving portion 43 of the latch 40.

Figure 8:
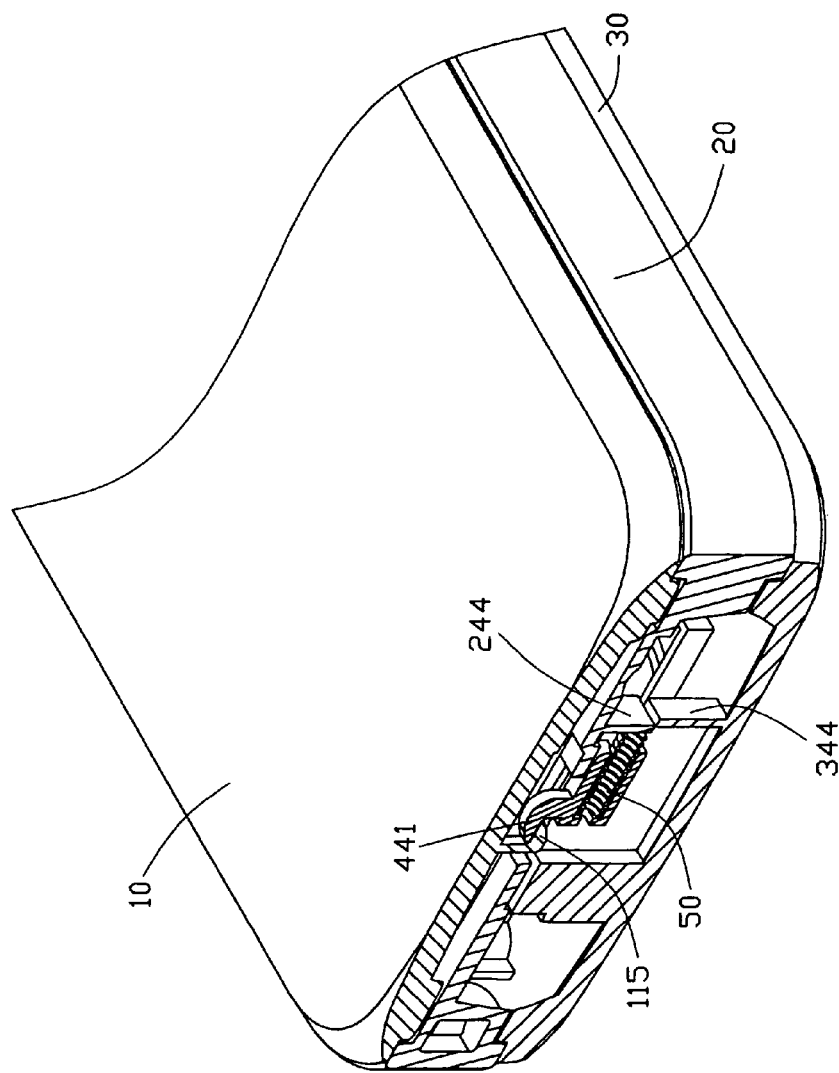
FIG. 8 is an enlarged, isometric, partial cross-sectional view of the mobile phone shown in FIG. 1.

Referring also to FIG. 8, in assembly, first, the spring 50 is received in the groove 434 of the spring receiving portion 43 of the latch 40, with a first end of the spring 50 abutting the resisting board 433 of the spring receiving portion 43. Second, the latch 40 is located in the latch containing portion 242. The hook 441 of the latch 40 is inserted through the through hole 245 of the housing 20. The button portion 42 is received in the button hole 221 of the housing 20. At this time, an opposite second end of the spring 50 abuts the second wall 244 of the housing 20, the body 41 of the latch 40 abuts an inner surface of the end wall 22, and the operation surface 421 of the button portion 42 is flat along an opposite outer surface of the end wall 22.

Third, the front cover 30 is aimed at the housing 20, so that the clasp portions 341 of the front cover 30 are each engaged with their corresponding clasps 241 of the housing 20. At the same time, the main board 343 of the front cover 30 is received in the latch containing portion 242, and abuts the first board 431, the second board 432, and the resisting boards 433 of the latch 40. The side board 344 of the front cover 30 is located above the second wall 244 of the housing 20, with the side board 345 of the front cover 30 abutting an opposite second end of the body 41 of the latch 40, and the assistant board 346 abutting the inner surface of the end wall 22. As a result, the latch 40 is fixed in the latch containing portion 242 of the housing 20. At this time, the latch 40 is in an original state.

Final, the second claws 113 of the battery cover 10 are each engaged with their corresponding limiting portions 247 of the housing 20. The battery cover 10 is rotated toward the housing 20 via the limiting portions 247. The first claws 112 of the battery cover 10 are each engaged with their corresponding claw portions 246 of the housing 20. If the hook 115 of the locking portion 114 contacts with the hook 441 of the latch 40, the battery cover 10 will continue to rotate toward the housing 20, the hook 441 of the latch 40 will be pressed to move toward the second wall 244 of the housing 20 until the battery cover 10 is engaged with the housing 20, with the spring 50 compressed. The latch 40 is in a second state, and then automatically returns to its original state under a decompression force of the spring 50, and the hook 441 of the engaging portion 44 is engaged with the hook 115 of the locking portion 114. Thus, the battery cover 10 is assembled with the housing 20 and the front cover 30 via the battery cover latching assembly 50.

When the battery cover 10 is to be detached from the housing 20, the user pushes the operation surface 421 of the latch 40. As a result, the hook 441 of the engaging portion 44 is disengaged from the hook 115 of the locking portion 114. Then, the battery cover 10 is rotated apart from the housing 20 via the limiting portions 247. The first claws 112 of the battery cover 10 are disengaged from the claw portions 246 of the housing 20, and the second claws 113 of the battery cover 10 are disengaged from the limiting portions 247 of the housing 20, thus, the battery cover 10 is detached from the housing 20.

In alternative embodiments, the front cover 30 could be attached to the housing 20 by another suitable method, for example by screws or pins. Also, the hook 115 of the locking portion 114 of the battery cover 10 and the hook 441 of the engaging portion 44 of the latch 40 could be omitted, and the locking portion 114 could be engaged with the engaging portion 44 by increasing a friction force therebetween. Furthermore, the spring 50 could be omitted or instead be another kind of elastic element or urging means known in the art, such as a resilient cylinder.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
a housing having a through hole and a button hole defined therein, the button hole communicating with the through hole;
a battery cover removably attached to the housing, the battery cover including a locking portion; and
a latch having an engaging portion, a spring receiving portion and a button portion, the engaging portion extending through the through hole, and releasably engaging with the locking portion, the button portion being movable in the button hole to disengage the locking portion from the engaging portion; the spring receiving portion defining a groove; and
a spring member being engaged in the groove and biasing the latch into engagement with the locking portion, and wherein a latch containing portion is formed in the partition wall adjacent to the other end wall of the housing, the latch containing portion includes a first wall, a part of the end wall, and a second wall connected the first wall and the end wall, wherein the latch containing portion has a bottom portion, and the bottom portion is a part of the partition wall, the through hole is defined in the bottom portion of the latch containing portion, and the button hole is defined in the end wall apart from the limiting portions and further comprising a front cover, wherein a resisting portion is disposed on an inner surface adjacent to one short side of the front cover, the resisting portion is engaged with the latch containing portion of the housing so as to fix the latch in the housing, and the resisting portion includes a main board, two side boards extending from two ends of the main board, and an assistant board extending from one end of the side board.

2. The portable electronic device as claimed in claim 1, wherein the battery cover includes a main body, two opposing long sides and two opposing short sides.

3. The portable electronic device as claimed in claim 2, wherein the main body has an inner surface, a plurality of first claws are disposed on the inner surface of the main body, adjacent to each long side, one end of each first claw is connected with the inner surface of the battery cover, and the other end of each first claw is hooked.

4. The portable electronic device as claimed in claim 3, wherein the housing comprises a main partition wall, a plurality of claw portions are formed in the partition wall, the claw portions are each engaged with their corresponding first claws of the battery cover.

5. The portable electronic device as claimed in claim 2, wherein the main body has an inner surface, a plurality of second claws are disposed on the inner surface of the main body, adjacent to one short side, one end of each second claw is connected with the inner surface of the battery cover, and the other end of each second claw is hooked.

6. The portable electronic device as claimed in claim 5, wherein the locking portion is formed at the other short side, one end of the locking portion is connected with the inner surface, and a hook is formed at the other end of the locking portion, the hook is made of an elastic material.

7. The portable electronic device as claimed in claim 6, wherein the housing comprises a main partition wall and two opposing end walls, a plurality of limiting portions are formed in the partition wall, adjacent to one end wall, and the limiting portions are each engaged with their corresponding second claws of the battery cover.

8. The portable electronic device as claimed in claim 6, wherein the latch includes a body, and the spring receiving portion formed at the one side of the body, the spring receiving portion includes a first board, a second board, and two separate resisting boards, which all extending from the body, the groove is defined in the body between the first board and the second board, the button portion is formed at the other side of the body.

9. The portable electronic device as claimed in claim 8, wherein a first side of the first board is flat along a first side of the body, the engaging portion is disposed at the first sides of the body and the first board, the engaging portion includes a hook, the hook is made of an elastic material, and the hook is releasably engaged with the hook of the battery cover.

10. The portable electronic device as claimed in claim 1, wherein the button portion has an operation surface, a plurality of protrusions is disposed in the operation surface, and the shape of the button portion corresponds to the button hole of the housing, a surface area of the button portion is smaller than that of the button hole of the housing.

11. The portable electronic device as claimed in claim 1, further comprising a front cover, the housing having first and second opposite sides facing away from each other, the battery cover removable attached to the first side of the housing, and the front cover attached to the second side of the housing.

12. The portable electronic device as claimed in claim 11, wherein the housing comprises two opposing sidewalls, a plurality of clasps are disposed on the sidewalls of the housing, a plurality of clasp portions are formed in an inner surface of the front cover, adjacent to each long side of the front cover, and each clasp portion engages with its corresponding clasp of the housing.

13. A portable electronic device comprising:
a housing having a main partition wall and a compartment defined in one side thereof, the partition wall forming a latch containing portion and defining a through hole;

a cover being movable into a closed position for covering the compartment, and into an opened position for exposing the compartment, the cover including a locking portion thereon;

a latch movably attached to the latch containing portion of the housing, one portion of the latch extending through the through hole and engaging with the locking portion when the cover is in the closed position thereby preventing the cover from moving toward the opened position, the latch disengaging from the locking portion when an outside force applied on the latch is in a first direction away from the locking portion thereby allowing the cover to move to the opened position; and a spring member urging the latch into engagement with the locking portion in a second direction that is opposite to the first direction, and wherein a first side of the first board is flat along a first side of the body, the engaging portion is disposed at the first sides of the body and the first board, the engaging portion includes a hook, the hook is made of an elastic material, and the hook is releasably engaged with the hook of the battery cover.

14. The portable electronic device as claimed in claim 13, wherein the latch includes a body, an engaging portion, a spring receiving portion formed at the one side of the body, and a button portion formed at the other side of the body, the spring receiving portion defines a groove, and the spring member is engaged with the groove.

15. The portable electronic device as claimed in claim 14, wherein the spring receiving portion includes a first board, a second board, and two separate resisting boards, which all extending from the body, the groove is defined in the body between the first board and the second board.

* * * * *